United States Patent [19]
Torihata et al.

[11] Patent Number: 6,135,270
[45] Date of Patent: Oct. 24, 2000

[54] GUIDE RAIL MECHANISM FOR A BONDING APPARATUS

[75] Inventors: Minoru Torihata, Musashimurayama; Shinji Maki, Fussa, both of Japan

[73] Assignee: Kabushiki Kaisha Shinkawa, Tokyo, Japan

[21] Appl. No.: 09/282,887

[22] Filed: Mar. 31, 1999

[30] Foreign Application Priority Data

Mar. 31, 1998 [JP] Japan ................................ 10-103981

[51] Int. Cl.⁷ .................................................. B65G 19/18
[52] U.S. Cl. ...................... 198/735.3; 198/741; 193/38; 193/15
[58] Field of Search .................................. 198/740, 741, 198/735.3; 193/38, 15

[56] References Cited

U.S. PATENT DOCUMENTS

| | | | |
|---|---|---|---|
| 3,854,688 | 12/1974 | Shrfort | 248/316 |
| 3,974,904 | 8/1976 | Morton | 193/38 |
| 5,823,316 | 10/1998 | Shaw et al. | 198/341 |
| 5,937,992 | 8/1999 | Davis et al. | 198/341.01 |

FOREIGN PATENT DOCUMENTS

| | | |
|---|---|---|
| S55-26696 | 2/1980 | Japan . |
| S60-63935 | 4/1985 | Japan . |
| S63-56121 | 11/1988 | Japan . |

*Primary Examiner*—Christopher P. Ellis
*Assistant Examiner*—Rashmi Sharma
*Attorney, Agent, or Firm*—Koda & Androlia

[57] ABSTRACT

A guide rail mechanism used for, for instance, a die boding apparatus and a wire bonding apparatus, including a pair of guide rail sections that face each other and convey a workpiece such as a lead frame in between. The guide rail sections include rail height adjustment spacers held by spring force between guide rails and guide rail stands, and this rail height adjustment spacer is replaced for other rail height adjustment spacers of different thicknesses by moving guide rail raising-and-lowering shafts by way of overcoming the spring forces of the springs provided thereon, thus assuring the same upper surface height level of workpieces of different thicknesses to be conveyed.

2 Claims, 7 Drawing Sheets

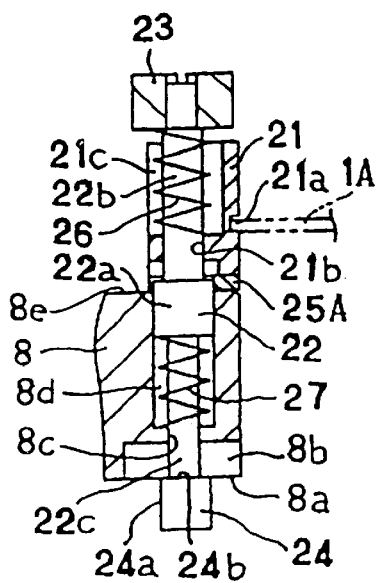
FIG. 3(a)
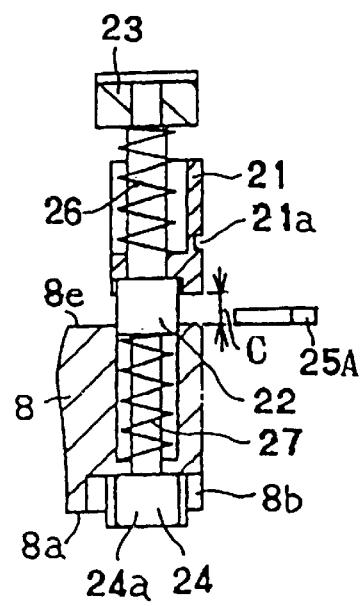
FIG. 3(b)
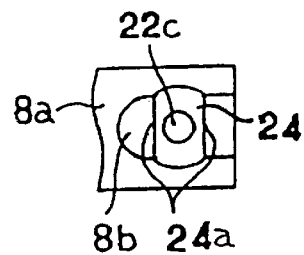
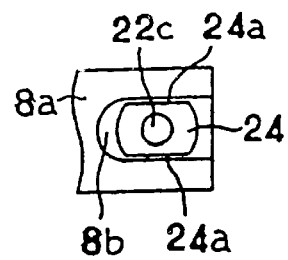

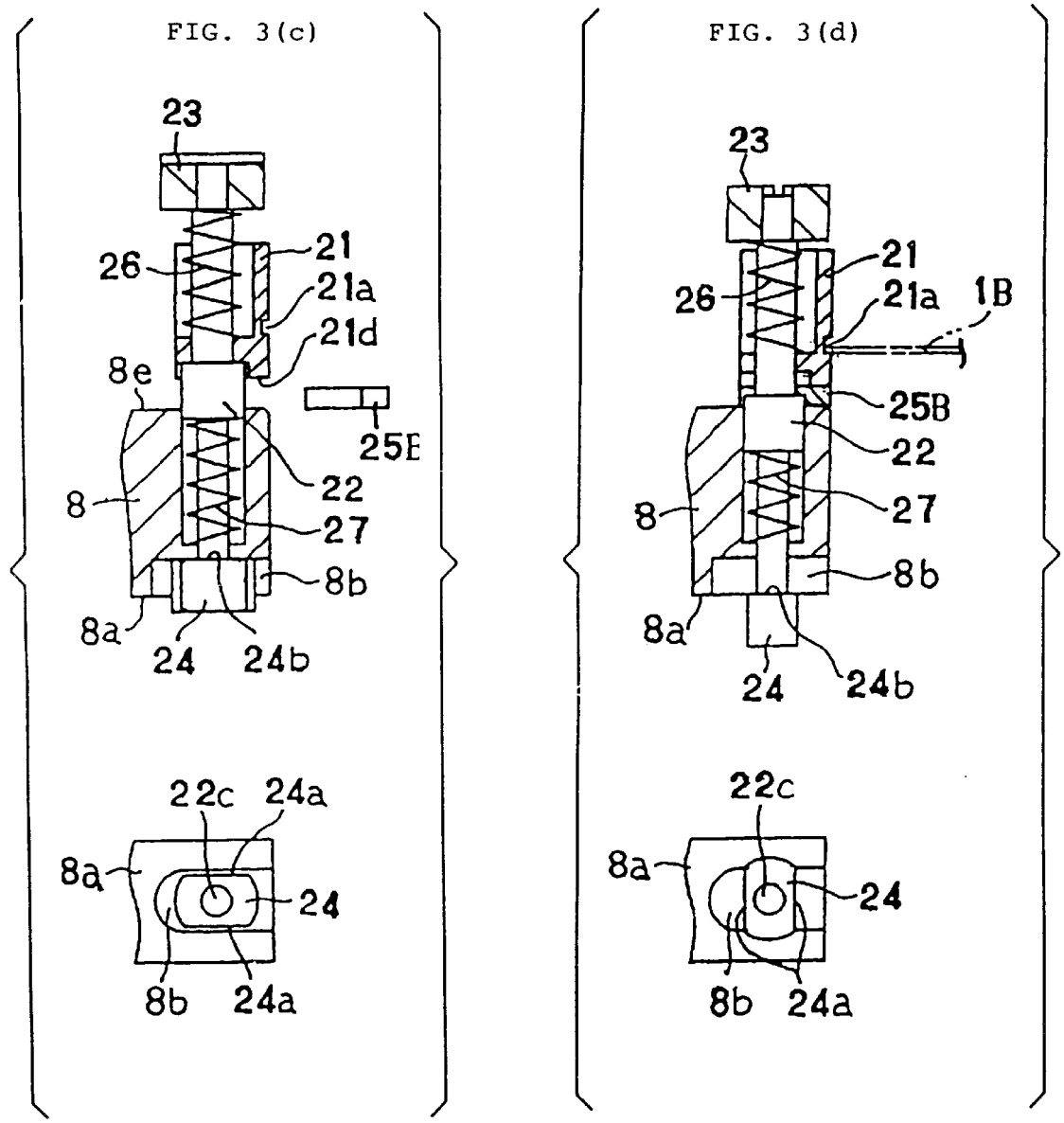

GUIDE RAIL MECHANISM FOR A BONDING APPARATUS

BACKGROUND OF THE INVENTION

1. Field of the Invention

The present invention relates to a guide rail mechanism for a bonding apparatus.

2. Prior Art

Conventionally, the guide rail mechanisms used in bonding apparatuses such as die bonding apparatuses, wire bonding apparatuses, etc. include, as shown in FIGS. 5 and 6, a pair of guide rail sections 2A and 2B which guide both sides of a workpiece such as a lead frame 1. Since these guide rail sections 2A and 2B have more or less the same structures, the same or corresponding members will be described using the same reference numerals.

A pair of width adjustment guides 4 which extend in the direction of width of a lead frame 1 being conveyed are disposed on the upper surface of a stand 3, and a slider 5 moved by a driving means (not shown) is slidably disposed on each of the width adjustment guides 4. A sliding block 6 is provided on the slider 5, a supporting block 7 is installed on the sliding block 6, and a guide rail stand 8 is provided on the inner surface of the supporting block 7. Here, the phrases the "direction of width of the lead frame 1" and the "inner surface of the supporting block 7" are meant to be relative to the direction of the position of the heating block 14 (described later) which is located substantially in the middle of the pair of the guide rail stands 8 as shown in FIG. 5. A screw shaft 9 provided in a vertical direction is formed with an internal thread 9a in its upper portion is fastened to each of the guide rail stands 8. A rail height adjustment spacer 10 and a guide rail 11 are provided over the screw shaft 9 of each guide rail stand 8.

Furthermore, a spring 12 is mounted on a portion of the screw shaft 9 extending out of each guide rail 11, and a bolt 13 is screwed to the internal thread 9a of the screw shaft 9. As a result, the rail height adjustment spacer 10 and guide rail 11 are fastened in place by being pressed against the guide rail stand 8 by the spring 12. Furthermore, the heating block 14 referred above is disposed between the guide rails 11 so as to heat the lead frame 1. The heating block 14 is moved vertically by a driving means (not shown).

Guide rail mechanisms described above are described in, for instance, Japanese Patent Application Laid-Open (Kokai) Nos. S55-26696 and S60-63935 and Japanese Patent Application Publication (Kokoku) No. 63-56121.

In the above prior art, the lead frame 1 is fed along the guide rails 11 to a bonding position (not shown) by a feeding claw (not shown). After the positioning, bonding is performed by a bonding apparatus (not shown) to the lead frame 1. In die bonding apparatuses, semiconductor pellets are bonded to the surface of a lead frame, and in wire bonding apparatuses, wires are connected between leads of a lead frame and pads on the semiconductor pellets bonded on the surface of the lead frame.

Thus, in bonding apparatuses, semiconductor pellets are bonded to the surfaces of lead frames, and wires are connected between the leads of the lead frames and the pads of semiconductor pellets. In this case, the upper surface of the lead frame acts as a reference surface at the height position during bonding. Accordingly, if the thickness of the lead frame changes as a result of a change in the type of lead frame to be handled, it needs an adjustment. In other words, in cases where the lead frame to be handled is thicker than the previously handled lead frames, the height of the upper surface of the lead frame, i.e., the upper surface of the reference surface, is heightened. Accordingly, the guide rails 11 must be lowered so as to compensate the difference in thickness, thus keeping the height of the reference surface at a constant level.

More specifically, when the newly handled lead frames differ in thickness from the previously handled lead frames, it is necessary to use the rail height adjustment spacers 10 which have a thickness suited to the thickness of the newly handled lead frames. When the rail height adjustment spacers 10 are changed, the bolts 13 are first loosened and removed from the screw shafts 9, the guide rails 11 and rail height adjustment spacers 10 are both removed, new rail height adjustment spacers 10 are installed, the rail height adjustment spacers 10 and guide rails 11 are put back, and then the bolts 13 are tightened back in the screw shafts 9.

Especially in cases where the guide sections 11a of the guide rails 11 are angled C-shaped ("[") and angled reverse-C-shaped ("]") as shown in FIGS. 5 through 7, it has conventionally been necessary to replace the guide rails 11 entirely if the thickness t of the lead frame 1 changes greatly. Ordinarily, the thickness t, as seen in FIG. 7, of a lead frame is in the range of 0.1 to 0.4 mm. Accordingly, the height h of the guide sections 11a of the guide rails 11 is obtained by adding a clearance c to the thickness t of the lead frame 1 so that lead frame 1 can be conveyed smoothly. Consequently, in cases where the thickness t of the lead frame 1 is within the range of the height h of the guide sections 11a, it is necessary to replace only the rail height adjustment spacers 10, even if the thickness of the lead frame should change. However, in cases where the thickness t of the changed lead frame exceeds the height h of the guide sections 11a, the guide rails 11 must be replaced with guide rails that are suited to the changed lead frame.

In the above prior art, in cases where the thickness t of the lead frame 1 changes as a result of a change in the type of a workpiece (lead frame) to be handled, it is necessary to loosen and remove the bolts 13, replace the rail height adjustment spacers 10, put the bolts 13 back and then tighten them. In addition, the pair of guide rails 11 are installed so as to extend in the direction in which the workpieces are conveyed; accordingly, each one of the guide rail sections 2A and 2B is provided with two screw shafts 9 along the conveying direction, and springs 12 are mounted on the respective screw shafts 9 so that bolts 13 press the guide rails 11 and rail height adjustment spacers 10 against the guide rail stands 8 via the spring 12.

In other words, since each of the guide rails 11 have two screw shafts 9, two screws 12, two bolts 13, etc, when a lead frame of a different thickness is to be handled, four bolts 13 are loosened and removed, the rail height adjustment spacers 10 are replaced with other rail height adjustment spacers that suite the thickness of the lead frames to be handled, the guide rails 11 are put back, and then the bolts 13 are tightened back in the screw shafts 9. Thus, the adjustment requires a long period of time, resulting in a drop in productivity.

SUMMARY OF THE INVENTION

Accordingly, the first object of the present invention is to provide a guide rail mechanism for a bonding apparatus in which the adjustment of the height of the guide rails in response to a change in the type (thickness) of a workpiece to be handled can be performed in a short time, thus improving the productivity.

The above object is accomplished by a unique structure for a guide rail mechanism which is used for a bonding apparatus and includes a pair of guide rails mounted on guide rail stands with rail height adjustment spacers in between so as to guide a workpiece such as a lead frame; and in the present invention:

raising-and-lowering shafts are vertically provided in the guide rail stands so as to be moveable upward and downward and rotatable in the guide rail stands, each of the raising-and-lowering shafts being formed with a central shaft portion disposed at substantially an axial center thereof and an upper shaft portion and a lower shaft portion which are smaller in diameter than the central shaft portion and formed on both ends of the central shaft portion;

guide rail driving springs are provided in the guide rails so as to press the guide rails against the central shaft portions of the raising-and-lowering shafts; and shaft driving springs are provided in the guide rail stands so as to urge the raising-and-lowering shafts upward; and further the guide rails are coupled to the upper shaft portions of the raising-and-lowering shafts so as to be movable upward and downward; and the raising-and-lowering shafts are maintained at an elevated position and at a lowered position, the elevated position being where the guide rails are lifted by the central shaft portions of the raising-and-lowering shafts by way of the shaft driving springs so as to form gaps between the guide rails and the guide rail stands and to allow the rail height adjustment spacers to be brought into and taken out of the gaps; and the lowered position being where the raising-and-lowering shafts are moved downward so that the guide rail height adjustment spacers are held between the guide rails and the guide rail stands by way of the guide rail driving springs.

In the above structure, the raising-and-lowering shafts are provided with positioning blocks, and the guide rail stands are provided with block receiving grooves. The positioning blocks are formed with flat side surfaces and attached to the end portions of the lower shaft portions of the raising-and-lowering shafts, and the block receiving grooves which are slightly larger than the positioning blocks are formed in undersurfaces of the guide rail stands so that the block receiving grooves receives therein the positioning blocks when (the flat surfaces of) the positioning blocks are aligned with the block receiving grooves.

When the positioning blocks are aligned with and inside of the block receiving grooves, the positioning blocks are pressed against the block receiving grooves and the raising-and-lowering shafts are in the elevated position. As a result, the gaps referred to above are formed, and the rail height adjustment spacers can be brought into and taken out of the gaps which are between the guide rails and the guide rail stands. On the other hand, when the positioning blocks are not aligned with and outside of the block receiving grooves, the positioning blocks are pressed against the undersurfaces of the guide rail stands so that the raising-and-lowering shafts are in the lowered position. As a result, the rail height adjustment spacers are held between the guide rails and the guide rail stands.

BRIEF DESCRIPTION OF THE DRAWINGS

FIGS. 3(a) through 3(d) are enlarged sectional and bottom views showing the operation taken in a case where the type of lead frame to be handled is changed from a thick lead frame to a thin lead frame;

DETAILED DESCRIPTION OF THE PREFERRED EMBODIMENTS

Figure 1:
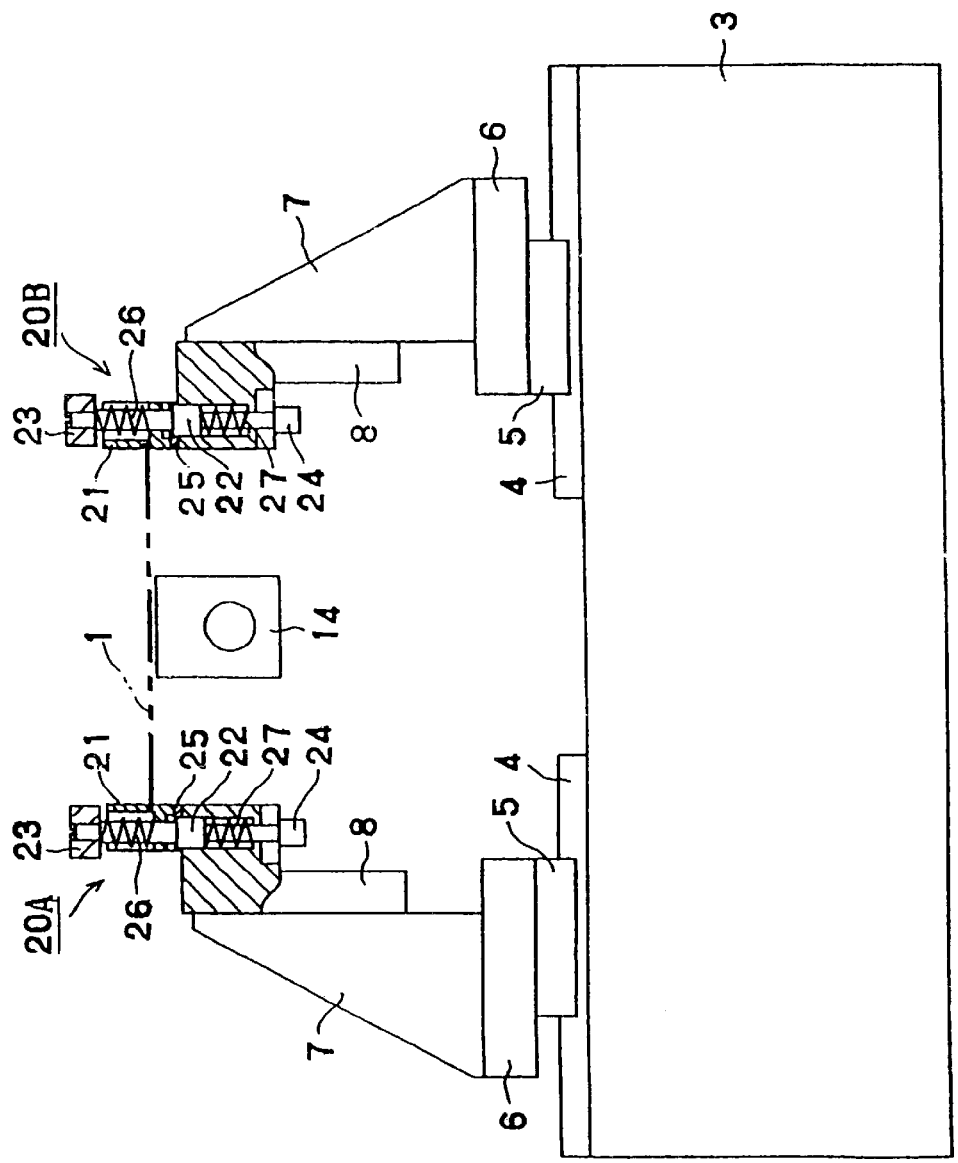
FIG. 1 is a partially sectional side view of a first embodiment of the guide rail mechanism for a bonding apparatus according to the present invention.
Figure 5:
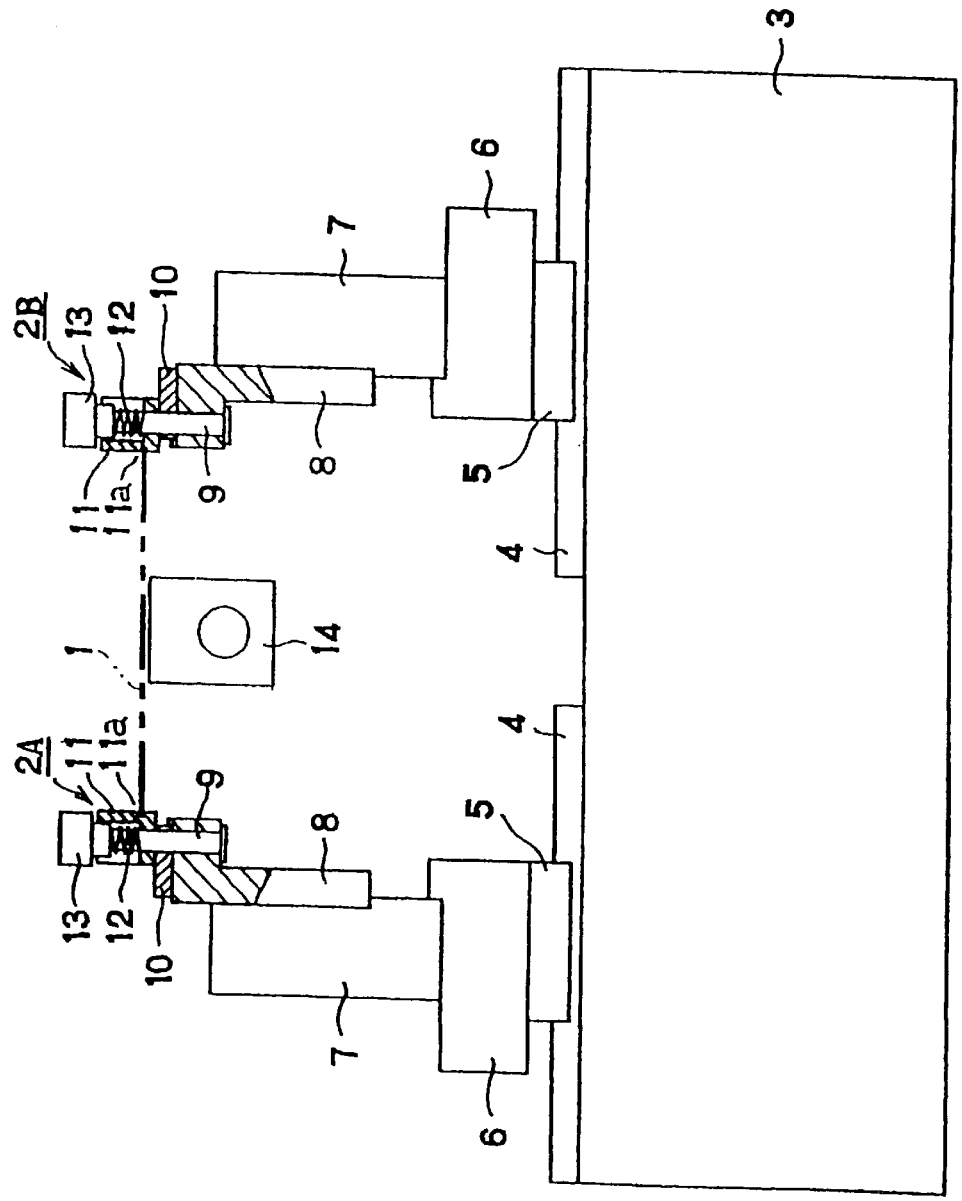
FIG. 5 is a partially sectional side view of a conventional guide rail mechanism for a bonding apparatus.
Figure 6:
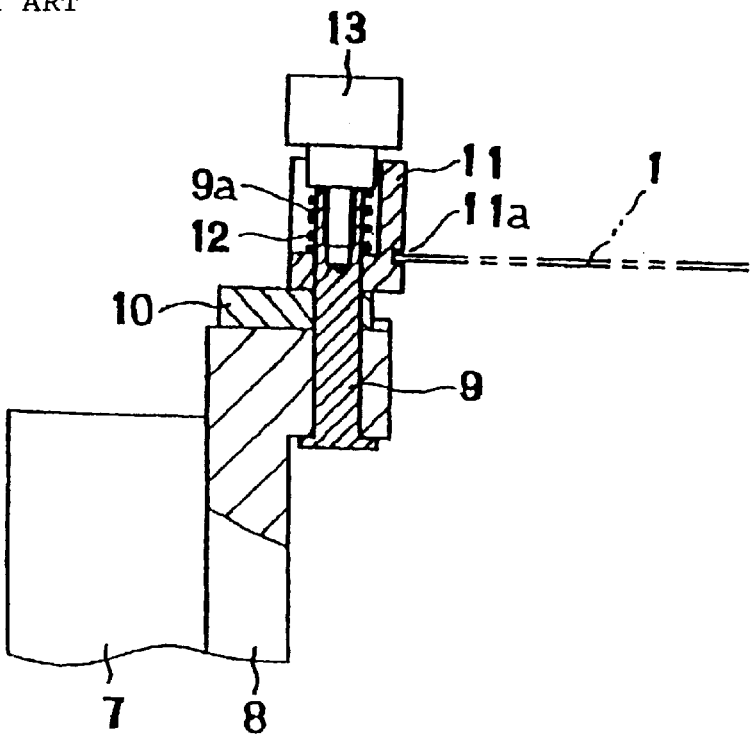
FIG. 6 is an enlarged sectional view of the essential portion of the prior art shown in FIG. 5.
Figure 7:
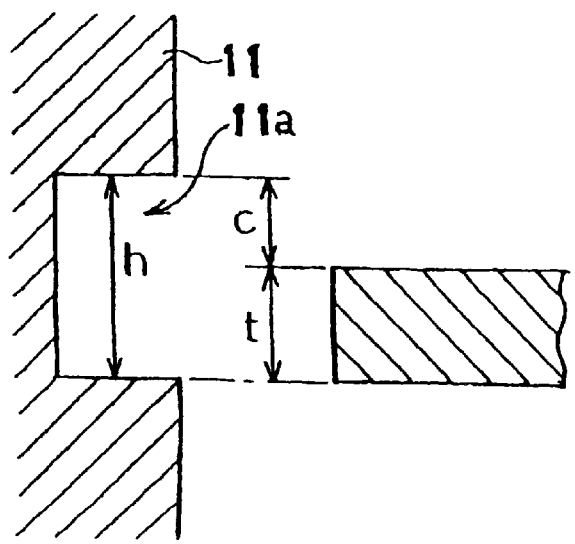
FIG. 7 illustrates the relationship between a lead frame and a guide section of the guide rail.

One embodiment of the present invention will be described with reference to FIGS. 1 through 3. Constituting elements which are the same as the prior art shown in FIGS. 5 and 6 or which correspond to the elements in FIGS. 5 and 6 are labeled with the same reference numerals, and a description of such elements is omitted.

The guide rail mechanism comprises a pair of guide rail sections 20A and 20B. Each one of the guide rail sections 20A and 20B includes a pair of guide rail stands 8 provided on supporting blocks 7 and a guide rail 21 provided on the guide rail stands 8 as best seen from FIG. 2. The guide rail 21 of the guide rail section 20A has a guide part 21a which is formed in an angled C-shape (though not shown, the guide rail 21 of the guide rail section 20B has a guide part which is formed in an angled reverse-C-shape so as to face the angled C-shaped guide part 21a of the guide rail 21 of the guide section 20A).

The guide rail sections 20A and 20B further include raising-and-lowering shafts 22. As best seen from FIG. 2, each one of these raising-and-lowering shafts 22 is provided in each one of the guide rail stands 8, and the two raising-and-lowering shafts 22 mount the guide rail 21 thereon as will be described in detail later. A knob 23 and a positioning block 24 are respectively fastened to the upper and lower ends of each one of the raising-and-lowering shafts 22 by screws (not shown), and a rail height adjustment spacer 25 is, as seen from FIG. 2, horizontally inserted between the guide rail stands 8 and the guide rail 21 of each one of the guide rail sections 20A and 20B. A guide rail driving spring 26 and a raising-and-lowering shaft driving spring (merely called "shaft driving springs") 27, for respectively urging the guide rail 21 and the raising-and-lowering shaft 22, are provided on each one of the raising-and-lowering shafts 22.

The above structure will be described in more detail below.

As seen from FIG. 3(a), for instance, each one of the raising-and-lowering shafts 22 consists of a central shaft portion 22a, an upper shaft portion 22b and a lower shaft portion 22c. The central shaft portion 22a is formed at substantially the center of the raising-and-lowering shaft 22 in its axial direction; and the upper shaft portion 22b and the lower shaft portion 22c are respectively formed above and below the central shaft portion 22a. The upper shaft portion 22b and the lower shaft portion 22c are smaller in diameter than the central shaft portion 22a. The above-referred guide rail driving spring 26 and shaft driving spring 27 are respectively mounted on the upper shaft portion 22b and the lower shaft portion 22c.

The knob 23 and the positioning block 24 are respectively screwed to the end portions of the upper shaft portion 22b and lower shaft portion 22c of each raising-and-lowering shaft 22. The positioning block 24 has flat side surfaces 24a formed on both side surfaces thereof.

Figure 2:
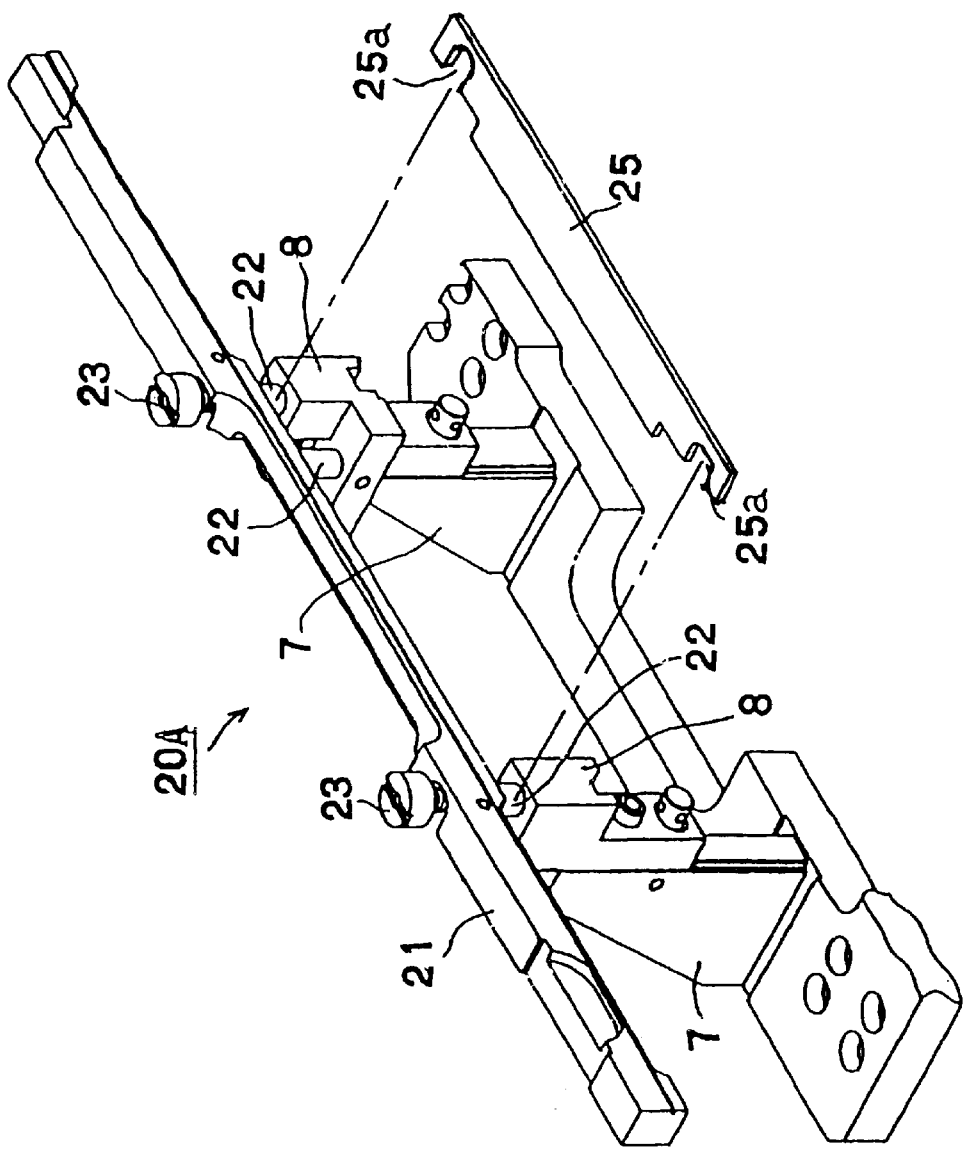
FIG. 2 is a perspective view showing one of the guide rail sections of the guide rail mechanism of the present invention.

Each of the rail height adjustment spacers 25 is, as best seen from FIG. 2, formed with U-shaped cut-outs 25a at both ends thereof. These cut-outs 25a can snugly engage the upper shaft portions 22b of each one of the raising-and-lowering shafts 22.

The guide rail 21 of each one of the guide rail sections 20A and 20B is formed with guide rail shaft holes 21b and spring installation holes 21c. In the shown embodiment, two guide rail shaft holes and two spring installation holes are formed in the guide rail 21 so as to comply, in number, with the rail stands 8 of each one of the rail sections 20A and 20B. Since each one of the guide rail shaft holes 21b and spring installation holes 21c has the same structure; the description thereof will be made for only one of them. More specifically, as best seen in FIG. 3(a), the guide rail shaft hole 21b is formed in the bottom of the rail 21, and the upper shaft portion 22b of the raising-and-lowering shaft 22 is inserted into the guide rail shaft hole 21b so that the upper shaft portion 22b can be moved upward and downward therein. The spring installation hole 21c is formed above the guide rail shaft hole 21b so that the guide rail driving spring 26 mounted on the upper shaft portion 22b of the raising-and-lowering shaft 22 is accommodated inside the spring installation hole 21c.

The guide rail stands 8 of each one of the guide rail sections 20A and 20B are formed with block receiving grooves 8b, guide stand shaft holes 8c and spring installation holes 8d. Since in the shown embodiment, each one of guide rail stands 8 has the same structure; the following description will be made for only one of them. Since each one of the guide rail stands 8 has the same structure, and therefore, each one of the block receiving grooves 8b, guide stand shaft holes 8c and spring installation holes 8d have the same structure; the description thereof will be made for only one of them. More specifically, as best seen in FIG. 3(b), the block receiving groove 8b is formed in the bottom of the guide rail stand 8. The block receiving groove 8b has a width that is slightly larger than the width of the positioning block 24 of the raising-and-lowering shaft 22 defined by the opposing two flat side surfaces 24a of the positioning block 24. The guide stand shaft hole 8c is opened in the upper portion of the block receiving groove 8b so that the lower shaft portion 22c of the raising-and-lowering shaft 22 can be moved therein. The spring installation hole 8d is formed above the guide stand shaft hole 8c so that the shaft driving spring 27 mounted on the lower shaft portion 22c of the raising-and-lowering shaft 22 is accommodated inside the spring installation hole 8d and the central shaft portion 22a of the raising-and-lowering shaft 22 can be moved upward and downward therein.

Each of the above-described raising-and-lowering shafts 22 is constructed so as to be maintained at an elevated position and at a lowered position.

The elevated position is where the guide rail 21 is in contact with and lifted by the central shaft portion 22a of the raising-and-lowering shaft 22 so that a gap C is, as shown in FIGS. 3(b) and 3(c), formed, and the rail height adjustment spacer 25 (25A, 25B) can be horizontally brought in and out of, from the side, the space C which is between the guide rail 21 and the guide rail stand 8. On the other hand, the lowered position is where the raising-and-lowering shaft 22 is pushed down after the rail height adjustment spacer 25 is brought into the gap C and placed on the guide rail stand 8 so that the central shaft portion 22a of the raising-and-lowering shaft 22 is, as shown in FIGS. 3(a) and 3(d), separated from and not in contact with the guide rail 21. Thus, at the lowered position, the rail height adjustment spacer 25 is held between the guide rail 21 and the guide rail stand 8.

Each one of the guide rail sections 20A and 20B is assembled in the following manner. Since each of the guide rail sections 20A and 20B has the same structure, the description will be made for only one of the two:

The shaft driving spring 27 is mounted on the lower shaft portion 22c of the raising-and-lowering shaft 22; the lower shaft portion 22c is inserted into the guide stand shaft hole 8c through the spring installation hole 8d of the guide rail stand 8; the positioning block 24 is screw-fastened to the end portion of the lower shaft portion 22; and the positioning block 24 is turned so that the flat side surfaces 24a thereof are aligned with the block receiving groove 8b of the guide rail stand 8. As a result, the raising-and-lowering shaft 22 is moved upward by the shaft driving spring 27, and the positioning block 24 is pressed against the upper surface of the block receiving groove 8b as shown in FIGS. 3(b) and 3(c). On the other hand, the guide rail 21 is mounted on the raising-and-lowering shaft 22 so that the upper shaft portion 22b of the raising-and-lowering shaft 22 is inserted into the guide rail shaft hole 21b of the guide rail 22; the guide rail driving spring 26 is mounted on the upper shaft portion 22b of the raising-and-lowering shaft 22; and then the knob 23 screw-fastened to the end portion of the upper shaft portion 22b of the raising-and-lowering shaft 22. The assembly of the guide rail sections 20A and 20B is thus completed.

The rail height adjustment spacer 25 (25A or 25B) is installed in each one of the guide rail sections 20A and 20B in the following manner. Since each of the guide rail sections 20A and 20B has the same structure, the description will be made with reference to only one of them:

The guide rail 21 is brought into the elevated position by the shaft driving spring 27 (see FIG. 2 and FIGS. 3(b) and 3(c)), the rail height adjustment spacer 25 (25A or 25B) is inserted from the side of the guide rail 21 into the gap formed between the guide rail stand 8 and the guide rail 21; the knob 23 is pushed downward by hand until the upper surface 24b of the positioning block 24 is moved to the level of the undersurface 8a of the guide rail stand 8; and the knob 23 is rotated 90 degrees; and the hand is released from the knob 23. As a result, the shaft driving spring 27 presses the upper surface 24b of the positioning block 24 against the undersurface 8a of the guide rail stand 8; and also, the guide rail driving spring 26 presses the guide rail 21 against the upper surface 8e of the guide rail stand 8 with the rail height adjustment spacer 25 (25A or 25B) in between as shown in FIGS. 3(a) and 3(d). The rail height adjustment spacer 25 is thus set in the guide rail sections.

Next, an operation will be described below when the lead frame to be handled is changed from a thick lead frame 1A as shown in FIG. 3(a) to a thin lead frame 1B as shown in FIG. 3(d).

From the state shown in FIG. 3(a) in which the rail height adjustment spacer 25A is employed, the knob 23 is slightly pushed down by hand and rotated 90 degrees about the axis of the raising-and-lowering shaft 22 so that the flat side surfaces 24a of the positioning block 24 are aligned with the block receiving groove 8b (see FIG. 3(b)). Then, the hand is released, allowing the raising-and-lowering shaft 22 to be pushed upward by the expanding shaft driving spring 27. As a result, the positioning block 24 is pressed against the upper surface of the block receiving groove 8b as shown in FIG. 3(b); and the guide rail 21 is moved upward by the central shaft portion 22a of the raising-and-lowering shaft 22. Thus, the guide rail stand 8 and guide rail 21 are separated, and the gap C is formed. The rail height adjustment spacer 25A for a thick lead frame 1A is removed by being pulled sideways towards right in FIG. 3(b).

Next, as shown in FIG. 3(c), the rail height adjustment spacer 25B which is thicker than the rail height adjustment spacer 25A by an amount equal to the difference in thickness between the thick lead frame 1A and the thin lead frame 1B is inserted into the gap C which is between the guide rail stand 8 and the guide rail 21 and then positioned on the guide rail stand 8. The cut-out 25a of the rail height adjustment spacer 25B is snugly engaged with the outer surface of the central shaft portion 22a of the raising-and-lowering shaft 22.

After this, the knob 23 is pushed down by hand until the positioning block 24 is positioned beneath the undersurface 8a of the guide rail stand 8, thus contracting the shaft driving spring 27 the spring installation hole 8d. The knob 23 is then turned 90 degrees about the axis of the raising-and-lowering shaft 22, and the hand is released from the knob 23. As a result, the upper surface 24b of the positioning block 24 is pressed against the undersurface 8a of the guide rail stand 8 by the shaft driving spring 27 that attempts to expand, and the guide rail 21 is pressed against the upper surface of the guide rail stand 8 with the rail height adjustment spacer 25B in between by the guide rail driving spring 26 as shown in FIG. 3(d).

As a result, the upper surface of the thin lead frame 1B is positioned at the same height level as the upper surface of the thick lead frame 1A.

When thick lead frames are to be conveyed, the rail height adjustment spacer 25B for thin lead frames is replaced by the rail height adjustment spacer 25A for thick lead frames by the same operation as described above.

As seen from the above, the height of the guide rail 21 can be adjusted merely by: moving the raising-and-lowering shaft 22 vertically using the knob 23, rotating the raising-and-lowering shaft 22 approximately 90 degrees, replacing the rail height adjustment spacer 25 (25A or 25B); and then again bringing back the raising-and-lowering shaft 22 to the original position by moving and turning the raising-and-lowering shaft 22. Accordingly, the height adjustment of the guide rail 21 can be accomplished in a short time, so that productivity is improved.

FIG. 4 illustrates a second embodiment of the present invention. FIGS. 4(a) and 4(b) respectively correspond to FIGS. 3(a) and 3(b).

Generally, guide rails used for workpieces such as lead frames come in two types. One type has angled C-shaped ("[") and angled reverse-C-shaped ("]") guide parts 21a as shown in FIGS. 1 through 3, and another type has guide sections whose upper surfaces are open as disclosed in Japanese Patent Application Laid-Open (Kokai) No. S60-63935. The first embodiment is explained with reference to guide rails that have angled C-shaped and angled reverse-C-shaped guide parts 21a. In the second embodiment shown in FIG. 4, the guide rails that have opened upper surfaces are employed. Structure other than the guide rails are the same as that of the first embodiment.

Figure 4A:
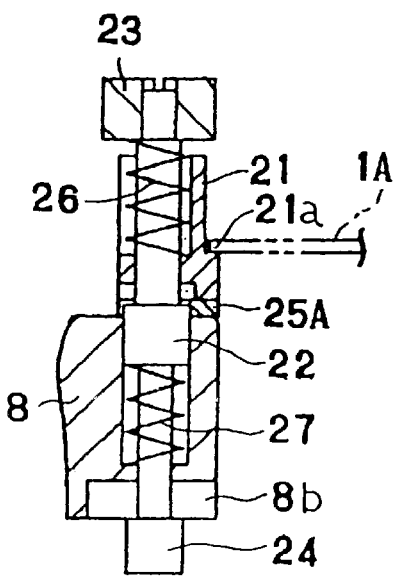
FIGS. 4(a) and 4(b) are partially sectional side and bottom views of a second embodiment of the guide rail mechanism for a bonding apparatus according to the present invention, respectively corresponding to FIGS. 3(a) and 3(b)
Figure 4A:
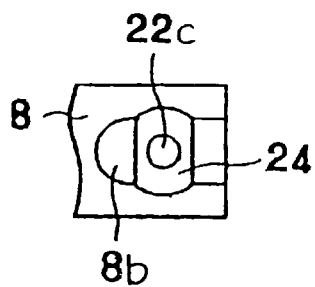
Figure 4B:
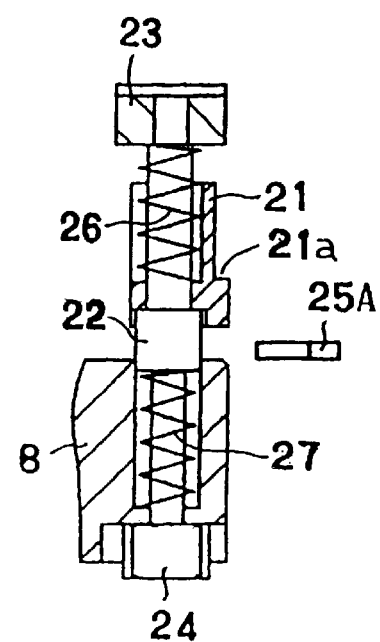
Figure 4B:
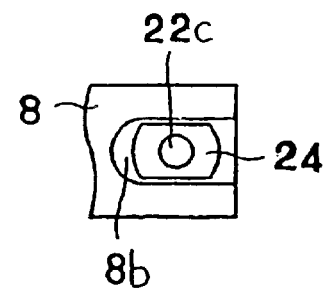

Accordingly, as seen from FIGS. 4(a) and 4(b), both edges of the lead frame 1A are supported on the opened upper surfaces of the guide parts 21a (only one guide part is shown) which are adjusted to the same height level by the rail height adjustment spacers 25A. When a thin lead frame 1B is conveyed, the rail height adjustment spacers 25A are replaced with the rail height adjustment spacers 25B.

The same effect as those described with reference to the first embodiment is obtained by the second embodiments. In other words, the present invention is applicable to guide rails which have open guide sections.

As seen from the above, the guide rail mechanism of the present invention which is used for a bonding apparatus and guides a workpiece such as a lead frame includes a pair of guide rails mounted on guide rail stands with rail height adjustment spacers in between; and in the present invention: raising-and-lowering shafts are vertically provided in the guide rail stands so as to be moveable upward and downward and rotatable in the guide rail stands, each of the raising-and-lowering shafts being formed with a central shaft portion disposed at substantially an axial center thereof and an upper shaft portion and a lower shaft portion which are smaller in diameter than the central shaft portion and are formed on both ends of the central shaft portion; guide rail driving springs are provided in the guide rails so as to press the guide rails against the central shaft portions of the raising-and-lowering shafts; and shaft driving springs are provided in the guide rail stands so as to urge the raising-and-lowering shafts upward; and wherein the guide rails are coupled to the upper shaft portions of the raising-and-lowering shafts so as to be movable upward and downward; and the raising-and-lowering shafts are maintained at an elevated position and at a lowered position; the elevated position being where the guide rails are lifted by the central shaft portions of the raising-and-lowering shafts by way of the shaft driving springs so as to form gaps between the guide rails and the guide rail stands to allow the rail height adjustment spacers to be brought into and taken out of the gaps, and the lowered position being where the raising-and-lowering shafts are moved downward so that the guide rail height adjustment spacers are held between the guide rails and the guide rail stands by way of the guide rail driving springs.

Accordingly, the height adjustment of the guide rails, so as to meet the changes in the type (thickness) of workpiece to be handled, can be accomplished in a short time, thus improving the productivity.

What is claimed is:

1. A guide rail mechanism for a bonding apparatus comprising a pair of guide rails that guide a workpiece and mounted on guide rail stands via rail height adjustment spacers, wherein said guide rail mechanism comprises:

raising-and-lowering shafts vertically provided in said guide rail stands so as to be moveable upward and downward and rotatable in said guide rail stands, each of said raising-and-lowering shafts being formed with a central shaft portion disposed at substantially an axial center thereof and an upper shaft portion and a lower shaft portion which are smaller in diameter than said central shaft portion and formed on both ends of said central shaft portion, guide rail driving means provided in said guide rails and press said guide rails against said central shaft portions of said raising-and-lowering shafts; and shaft driving means provided in said guide rail stands so as to urge said raising-and-lowering shafts upward; and wherein said guide rails are coupled to said upper shaft portions of said raising and-lowering shafts so as to be movable upward and downward; and said raising-and-lowering shafts is maintained at an elevated position and at a lowered position, said elevated position being where said guide rails are lifted by said central shaft portions of said raising-and-lowering shafts by way of said shaft driving means so as to form gaps between said guide rails and said guide rail stands and to allow said rail height adjustment spacers to be brought into and taken out of said gaps, and said lowered position being where said raising-and-lowering shafts are moved downward so that said guide rail height adjustment spacers are held between said guide rail stand said guide rail stands by way of said guide rail driving means.

2. A guide rail mechanism according to claim 1, wherein said guide rail mechanism is further comprised of positioning blocks and block receiving grooves, said positioning blocks being formed with flat side surfaces and attached to lower ends of said lower shaft portions of said raising-and-lowering shafts, and said block receiving grooves being provided in said guide rail stands and formed slightly larger than said positioning blocks so as to receive said positioning blocks therein when said flat surfaces of said positioning blocks are aligned with said receiving grooves; and wherein when said flat surfaces of said positioning blocks are aligned with said block receiving grooves and said positioning blocks are inside said block receiving grooves, said positioning blocks press against said block receiving grooves so as to maintain said raising-and-lowering shafts at said elevated position; and when said flat surfaces of said positioning blocks are not aligned with said block receiving grooves and said positioning blocks are outside said receiving grooves, said positioning blocks press against undersurfaces of said guide rails so as to maintain said raising-and-lowering shafts at said lowered position.

* * * * *